United States Patent
Dong

(10) Patent No.: US 9,973,564 B2
(45) Date of Patent: May 15, 2018

(54) DETERMINING VARIABLE CHUNK SIZE FOR TRANSFER OF A FILE

(71) Applicant: Hewlett Packard Enterprise Development LP, Houston, TX (US)

(72) Inventor: Jing Dong, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 175 days.

(21) Appl. No.: 14/928,267

(22) Filed: Oct. 30, 2015

(65) Prior Publication Data

US 2017/0126779 A1     May 4, 2017

(51) Int. Cl.
G06F 15/16     (2006.01)
H04L 29/08     (2006.01)

(52) U.S. Cl.
CPC .......... H04L 67/06 (2013.01); H04L 67/2842 (2013.01)

(58) Field of Classification Search
CPC ..... H04L 67/1097; H04L 67/10; H04L 69/16; H04L 67/2842; H04L 67/06; H04L 67/34; H04L 49/9094; H04L 43/0882; H04L 5/0053; H04L 1/1812; H04L 1/1861; H04L 1/1893; H04L 5/0044; H04L 5/0007; H04L 45/06; H04L 45/122; H04L 45/74; G06F 3/064; G06F 3/067; G06F 12/0246
See application file for complete search history.

(56) References Cited

U.S. PATENT DOCUMENTS

| 6,076,151 | A | * | 6/2000 | Meier | G06F 9/383 707/999.202 |
|---|---|---|---|---|---|
| 8,145,782 | B2 | | 5/2012 | McGowan et al. | |
| 8,566,393 | B2 | | 10/2013 | Myers et al. | |
| 8,954,596 | B2 | | 2/2015 | Ronca et al. | |
| 2013/0232233 | A1 | | 9/2013 | Reza | |
| 2016/0048331 | A1 | * | 2/2016 | Gjoerup | G06F 13/385 710/30 |
| 2016/0149669 | A1 | * | 5/2016 | Meyers | H04L 1/0073 714/750 |

(Continued)

OTHER PUBLICATIONS

Horvat, Z., Web Service Design for Chunked Transfer of Large Quantities of Data, Aug. 18, 2011, C#Corner, 9 pages.

(Continued)

Primary Examiner — Djenane Bayard
(74) Attorney, Agent, or Firm — Brooks, Cameron & Huebsch, PLLC

(57) ABSTRACT

Example implementations relate to determining variable chunk size for transfer of a file. For example, a system for determining variable chunk size for transfer of a file may include an available memory engine to determine an amount of available memory in a receiving server, where the receiving server is to receive a transferred file greater than a threshold size from a sending server, a raw chunk size engine to determine a raw chunk size for transfer of the file based on the available memory of the receiving server and a memory usage ratio for the receiving server, and a variable chunk size engine to determine a variable chunk size for transfer of the file based on the raw chunk size and a memory storage integer limitation of the receiving server. The system may further include a transfer engine to cause a transfer of the file from the sending server to the receiving server using the variable chunk size.

19 Claims, 4 Drawing Sheets

(56) References Cited

U.S. PATENT DOCUMENTS

2017/0064342 A1* 3/2017 Botsford .......... H04N 21/23439

OTHER PUBLICATIONS

Mackey, T., Sending Files in Chunks with MTOM Web Services and .net 2.0, Nov. 23, 2007, Code Project, 9 pages.
Russell Sears et al., "To BLOB or Not To BLOB: Large Object Storage in a Database or a Filesystem?," Technical Report MSR-TR-2006-45, Apr. 2006, pp. 1-11, Microsoft Corporation.

* cited by examiner

DETERMINING VARIABLE CHUNK SIZE FOR TRANSFER OF A FILE

BACKGROUND

File repositories may provide the services to allow the users to transfer large documents, images, music, and/or video files. Some file repositories, may offer the users streaming capability where the transfer performance is not an important factor. In other instances, transfer performance may be an important factor. To that end, files may be transferred in pieces, or chunks.

DETAILED DESCRIPTION

Figure 1:
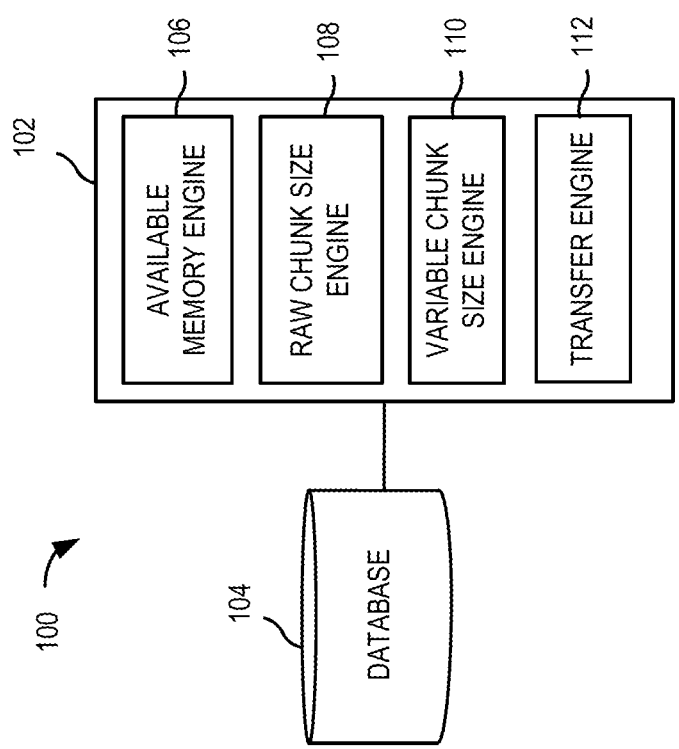
FIG. 1 is a block diagram of an example system for determining variable chunk size for transfer of a file consistent with the present disclosure.

Technological advances in data storage have increased the storage capacity of compute memory storage devices. However, with larger files being stored on a single computing device, transfer of such files from one computing device to another may result in decreased network performance. With the increase of file size, performance in transferring files may be an important consideration.

Different technologies and methods have been adopted to transfer a file from one computing device to another. Transferring a small file, such as in the Kilobit to Megabit range, may use different technologies and/or methods than transferring a larger file, such as in the Gigabit range. Further, different application platforms may introduce different challenges for transferring large files versus smaller files. For example, transferring a small application from an application store to a mobile computing device with limited memory space may pose different challenges than transferring a large file in an enterprise cloud environment with ample computing and storage resources. As used herein, a "large" file refers to a file having a size greater than a threshold file size, and a "small" file refers to a file having a size less than a threshold file size. In some examples, a large file may be a file having a size of 1 gigabyte (GB) or larger, and a small file may be a file having a size of less than 1 GB. However, examples are not so limited and a different threshold size may be used.

One of the main differences between transferring small files and large files is chunking. When transferring a small file, the whole file may be passed through the network because it can fit into the memory buffer before saving to the local file system. As used herein, a "memory buffer" refers to a portion of the computer's memory that is set aside as a temporary holding place for data that is being sent to or received from an external device. On the other hand, a larger file may not be transferred at once because the file size is larger than the memory buffer. Some solutions to transferring large files may include dividing the file into fixed chunks for transfer. Dividing the transfer of a large file into fixed chunks includes establishing a pre-determined chunk size. Put another way, some solutions use a fixed chunk size to transfer large files, where the fixed chunk size is decided before the file transfer. As used herein, a "chunk" refers to a subpart of the file to be transferred, such that a plurality of chunks comprises the entire file. Similarly, a "chunk size" refers to the size of each chunk in bytes, such that the file size equals the sum of the plurality of chunk sizes.

However, dividing a file into fixed chunks for file transfer may actually decrease network performance. The amount of computing resources, also referred to as the "chunking overhead", may be significant when a single file is divided into a large number of chunks. A fixed chunk size may work fine for transferring a file with a size less than 1 GB, but when the file size is larger than 1 GB, the chunking overhead may be significant. For example, a fixed chunk size of 1 megabyte (MB) may work fine for transfer of a file having a size of 6 MB, however, a file with a size of more than 1 GB may have significant chunking overhead if the file is divided into 1 MB chunks, such that more than 1000 chunks are created and transferred.

In contrast, determining variable chunk size for transfer of a file consistent with the present disclosure, allows for determination of chunk size at runtime based on factors such as current available memory in the receiving computing device, the size of the file to be transferred, a memory usage ratio, and a memory storage limitation of the receiving computing device. Thus, the size of chunks for file transfer may be determined to better utilize available memory. As used herein, a "variable chunk size" refers to a chunk size that may differ from transfer of one file to another file within the same network, is based on a number of factors including available memory, size of the file, a memory usage ratio, and memory storage limitations, and is decided at runtime of the network within which the file is being transferred.

FIG. 1 is a block diagram of an example system 100 for determining variable chunk size for transfer of a file consistent with the present disclosure. The system 100 may include a database 104, a variable chunk size system 102, and/or a number of engines. For instance, the system 100 may include an available memory engine 106, a raw chunk size engine 108, a variable chunk size engine 110, and a transfer engine 112. The variable chunk size system 102 may be in communication with the database 104 via a communication link, and may include the number of engines. Put another way, the variable chunk size system 102 may include available memory engine 106, raw chunk size engine 108, variable chunk size engine 110, and transfer engine 112. The variable chunk size system 102 may include additional or fewer engines than illustrated to perform the various operations as will be described in further detail in connection with FIGS. 2-4.

The number of engines may include a combination of hardware and programming, but at least hardware, to perform operations described herein. The number of engines may be stored in a memory resource and/or implemented as a hard-wired program, or "logic". As used herein, "logic" is an alternative or additional processing resource to perform a particular action and/or operation, described herein, which includes hardware, various forms of transistor logic, application specific integrated circuits (ASICs), among others, as opposed to computer executable instructions or instructions stored in memory and executable by a processor.

For example, the available memory engine 106, the raw chunk size engine 108, the variable chunk size engine 110, and/or the transfer engine 112, may include a combination of hardware and programming, but at least hardware, to perform operations related to determining variable chunk sizes for transfer of a file. As used herein, a memory resource may include a computer readable medium, and/or a machine-readable medium, among other examples. Also, as used herein, hard-wired programming may refer to logic.

The available memory engine 106 may include hardware and/or a combination of hardware and programming, but at least hardware, to determine an amount of available memory in a receiving server, where the receiving server is to receive a transferred file greater than a threshold size from a sending server. At runtime, each application within a computing network may use a certain amount of memory to process data. This physical memory may be allocated by the operating system of the server on a first-come-first-serve basis. That is, the physical memory may be allocated to applications in the order in which calls from the applications are received. When a request to transfer a file from one server to another server is initiated, the receiving server may determine how much memory is used by running processes, and therefore, how much memory is available for other processes. Put another way, when a request to transfer a file is received by the receiving server, the amount of memory that is not already being used by a running process, referred to herein as the "available memory", may be determined by the available memory engine 106.

The raw chunk size engine 108 may include hardware and/or a combination of hardware and programming, but at least hardware, to determine a raw chunk size for transfer of the file based on the available memory of the receiving server and a memory usage ratio for the receiving server. As used herein, a "raw chunk size" refers to a maximum chunk size for transfer of a file that may be used to determine the variable chunk size. Also, as used herein, a "memory usage ratio" refers to a ratio of a portion of the total available memory, as determined by the available memory engine 106, and the raw chunk size. Put another way, the memory usage ratio is a predetermined ratio of the available memory in the receiving server and a maximum raw chunk size.

For example, a memory usage ratio may specify that 40% of the available memory on a receiving server is reserved for other processes not related to the transfer of the file, and that the remaining 60% of the available memory on the receiving server may be used for the transfer of the file. In this example, the raw chunk size (also referred to as the "maximum chunk size") is 60% of the current available memory. This leaves at least 40% of the available memory for other processes, such that performance of the receiving server is not sacrificed. While a memory usage ratio of 40%/60% is used for illustrative purposes herein, it is noted that examples are not so limited and other memory usage ratios may be used.

In some examples, as described further herein, the raw chunk size engine 108 may determine the raw chunk size based in part on the size of the file to be transferred. Large file transfer applications may provide a file transfer progress bar for the users to see the progress of the file transfer. As used herein, a "file transfer progress bar" refers to a visual representation displayed on a user interface to display the percentage of the file that has already transferred the remaining percentage of the file to be transferred, and a remaining amount of time to complete the file transfer, among other pieces of information. This is useful for large file transfer that takes a long time because the users are able to see the progress and estimate the time to completion. Because the update of the file transfer progress bar may be performed at the end of processing each chunk of data, the chunk size may affect the frequency of updating the file transfer progress bar. For instance, there may be 1000 updates of a file transfer progress bar for a transfer of a 1 GB file with 1 MB chunk size, in contrast to 10 updates of a file transfer progress bar when the chunk size is 100 MB. Thus, the smaller the chunk size, the more detailed the file transfer progress bar updates. From a usability point of view, it may be better to see finer grained file transfer progress bar updates. However, from a performance point of view, it may be better to have big chunk size, which results in less file transfer progress bar updates. Therefore, variable chunk size may be based on the file size as well as the available memory in the receiving server.

For instance, the available memory engine 106 may determine the amount of available memory on the receiving server, and determine a first raw chunk size based on the memory usage ratio, as described above. The raw chunk size engine 108 may also receive a size of the file to be transferred from the sending server and determine a second raw chunk size corresponding to a step in a file transfer progress bar. As used herein, a "step" in the file transfer progress bar refers to an incremental update in the visual representation of the completion of the file transfer. For instance, a step in the file transfer progress bar may be from 10% complete to 20% complete, and/or 30% complete to 40% complete. Examples are not so limited, however, and other incremental updates other than 10% may be used. Put another way, the raw chunk size engine 108 may receive a size of the file to be transferred from the sending server, of 8 GB. The raw chunk size engine 108 may determine a raw chunk size of 800 MB, which corresponds to one step in the file transfer progress bar, or 10% of the total file size. In such examples, the raw chunk size engine 108 may determine the raw chunk size for use in determining the variable chunk size by selecting one of the first raw chunk size and the second raw chunk size based on byte size. For instance, the raw chunk size engine 108 may select the raw chunk size that was based on the memory usage ratio, or the raw chunk size that was based on the step in the file transfer progress bar.

The variable chunk size engine 110 may include hardware and/or a combination of hardware and programming, but at least hardware, to determine a variable chunk size for transfer of the file based on the raw chunk size and a memory storage integer limitation of the receiving server. As used herein, a "memory storage integer limitation" refers to the number of bytes in the receiving server used to store the transferred file, or data. For instance, a 4-byte (32 bits) storage device can hold an integer of data in the range: $-2,147,483,648$ to $2,147,483,647$ ($-2^{31}$ to $2^{31}-1$ or $-2$ G to $2$ G$-1$). Computer memory may be managed by the operating system and programming language in terms of serials of byte storage. Because chunks are stored inside the memory buffer of the receiving server, the chunks are limited by the size, in bytes, of the memory storage unit of the receiving server. Further, because computer memory is managed in binary, memory space and address may be referred to in terms of power of 2. Thus the variable chunk size may be normalized to the largest power of 2 that is less than the raw chunk size. For instance, for a 32-bit computer or receiving server, the chunk size is limited to $2^{31}-1$ or $2$ G$-1$. In such an example, the memory storage integer limitation may be $2$ G$-1$. As such, the variable chunk size engine 110 may determine the variable chunk size based on a number of bytes in the receiving server.

Further, the transfer engine 112 may include hardware and/or a combination of hardware and programming, but at least hardware, to cause a transfer of the file from the sending server to the receiving server using the variable chunk size. Put another way, the transfer engine 112 may cause the transfer of the file in chunks corresponding to the variable chunk size determined by the variable chunk size engine 110.

Figure 2:
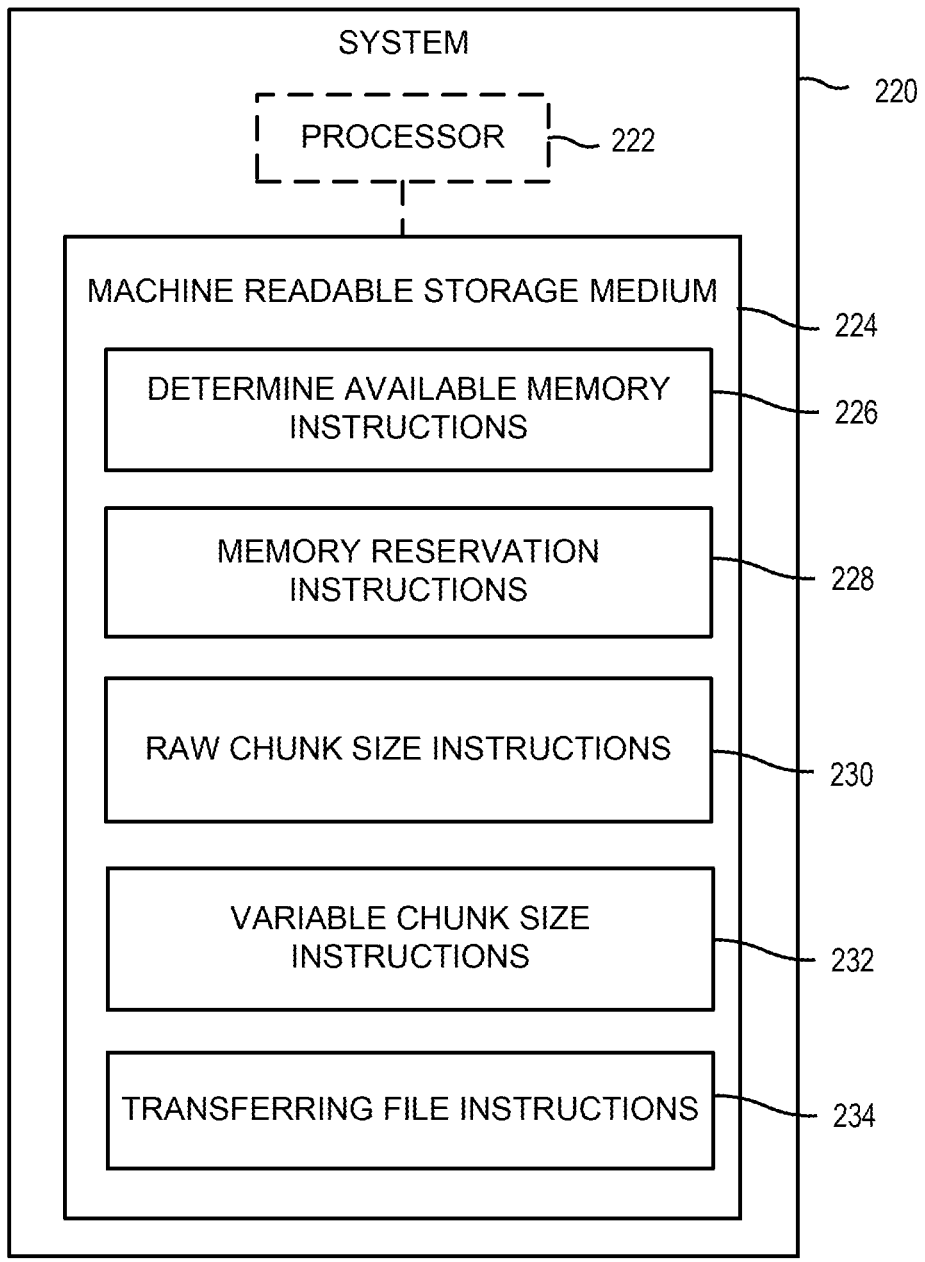
FIG. 2 is a block diagram of an example system for determining variable chunk size for transfer of a file, consistent with the present disclosure.

FIG. 2 is a block diagram of an example system 220 for determining variable chunk size for transfer of a file, consistent with the present disclosure. System 220 may include a computing device that is capable of communicating with a remote system. In the example of FIG. 2, system 220 includes a processor 222 and a machine-readable storage medium 224. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 222 may be a central processing unit (CPU), microprocessor, and/or other hardware device suitable for retrieval and execution of instructions stored in machine-readable storage medium 224. In the particular example shown in FIG. 2, processor 222 may receive, determine, and send instructions 226, 228, 230, 232, 234 for determining variable chunk size for transfer of a file. As an alternative or in addition to retrieving and executing instructions, processor 222 may include an electronic circuit comprising a number of electronic components for performing the operations of the instructions in machine-readable storage medium 224. With respect to the executable instruction representations or boxes described and shown herein, it should be understood that part or all of the executable instructions and/or electronic circuits included within one box may be included in a different box shown in the figures or in a different box not shown.

Machine-readable storage medium 224 may be any electronic, magnetic, optical, or other physical storage device that stores executable instructions. Thus, machine-readable storage medium 224 may be, for example, Random Access Memory (RAM), an Electrically-Erasable Programmable Read-Only Memory (EEPROM), a storage drive, an optical disc, and the like. Machine-readable storage medium 224 may be disposed within system 220, as shown in FIG. 2. In this situation, the executable instructions may be "installed" on the system 220. Machine-readable storage medium 224 may be a portable, external or remote storage medium, for example, that allows system 220 to download the instructions from the portable/external/remote storage medium. In this situation, the executable instructions may be part of an "installation package". As described herein, machine-readable storage medium 224 may be encoded with executable instructions for monitoring network utilization.

Referring to FIG. 2, determine available memory instructions 226, when executed by a processor such as processor 222, may cause system 220 to determine an amount of available memory in a receiving server, where the receiving server is to receive a transferred file from a sending server. For example, as described in relation to FIG. 1, the receiving server may determine how much memory is not being used by other processes, in response to receiving a request from a sending server to transfer a file.

In some examples, the instructions to determine the amount of available memory may include instructions executable by the processor 222 to determine the amount of available memory in the receiving server in response to receipt of a request from the sending server to transfer the file from the sending server to the receiving server, where the file has a size within a threshold range file size. For instance, a threshold of 1 G may be established, such that files larger than 1 G are divided up into chunks for transmission from one server to another within the network.

Memory reservation instructions 228, when executed by a processor such as processor 222, may cause system 220 to reserve a portion of the available memory of the receiving server for non-transfer processes. For instance, if the available memory in the receiving server is 12 G, the memory reservation instructions 228 may reserve a portion of the 12 G for processes that are not related to the transfer of a file. An example might be that 40% of the 12 G is reserved for other process usage, though examples are not so limited and other amounts of the available memory may be reserved.

Raw chunk size instructions 230, when executed by a processor such as processor 222, may cause system 220 to determine a raw chunk size for transfer of the file based on the reserved portion of the available memory. For example, as described above, 40% of the available memory (or 40% of the 12 G available memory) may be reserved for other processes. In such an example, the raw chunk size may be the size of 60% of the current available memory, or 7200 MB in the above example (60% of 12 G). Thus, the maximum chunk size may be 60% of the current available memory. As described in relation to FIG. 1, the ratio of 40%/60% (referred to herein as the memory usage ratio) is provided for illustrative purposes only, and other ratios may be used.

The raw chunk size instructions 230 may further include instructions executable by the processor 222 to receive from the sending server, a size of the file to be transferred and determine a fraction of the file size that corresponds with a step in a file transfer update bar, as described in relation to FIG. 1. For instance, the sending server may identify that the file size is 3 G, and the raw chunk size instructions 230 may determine that a step in the file transfer update bar corresponds with 10% of the file size, or 300 MB.

Similarly, the raw chunk size instructions 230 may include instructions executable by the processor to determine a remaining portion of the available memory for transfer of the file, based on the reserved portion, and identify a lesser of: a raw chunk size corresponding to the remaining memory and a raw chunk size corresponding to a fraction of the file. As described above, the memory reservation instructions 228 may determine that the remaining 60% (or other portion) of the available memory may be the raw chunk size (7200 MB in the above example). As described above, a fraction of the file corresponding to the step of the file transfer update bar may be determined, and may also be the raw chunk size (300 MB in the above example). In this example, the raw chunk size instructions 230 may identify the lesser of 7200 MB and 300 MB, or 300 MB, as the raw chunk size for determining the variable chunk size.

Variable chunk size instructions 232, when executed by a processor such as processor 222, may cause system 220 to determine a variable chunk size for transfer of the file based on a number of bytes in the receiving server and the raw chunk size. For example, the variable chunk size instructions 232 may determine a variable chunk size that is the largest power of 2 that is less than the raw chunk size (300 MB in the above example). That is, the variable chunk size may be determined by solving for n (a value in bits) in the following equation: $2^n \leq$ raw chunk size. In the example above, the variable chunk size would be $2^{28}$ bytes. Using a raw chunk size of 300 MB, which is equivalent to 314,572,800 bytes, the variable chunk size may be determined using $2^{28} \leq 314,572,800$ (i.e., $2^{28}$ is 268,435,456, which is less than 314,572,800).

Transferring file instructions 234, when executed by a processor such as processor 222, may cause system 220 to cause a transfer of the file from the sending server to the receiving server based on the variable chunk size. Put another way, the instructions to transfer the file from the sending server to the receiving server may include instructions executable by the processor 222 to transfer the file in a plurality of chunks, wherein each of the plurality of chunks has a size corresponding to the variable chunk size. Using the above example, the file having a size of 3 G may be transferred from a first server to a second server in variable chunks having a size of $2^{28}$ bytes. Examples are not so limited, however, and other variable chunk sizes may be used, as described herein.

As described herein, the variable chunk size may be determined at runtime, and may depend on various factors. As such, the variable chunk size for transferring one file may differ from the variable chunk size of a second file. Accordingly, in some examples, the file described above may be a first file and the determined variable chunk size may be a first variable chunk size. As such, the system 220 may further include instructions executable by the processor 222 to determine a second variable chunk size for transfer of a second file from the sending server to the receiving server, according to the operations described above. In such an example, the second variable chunk size may be different than the first variable chunk size.

Figure 3:
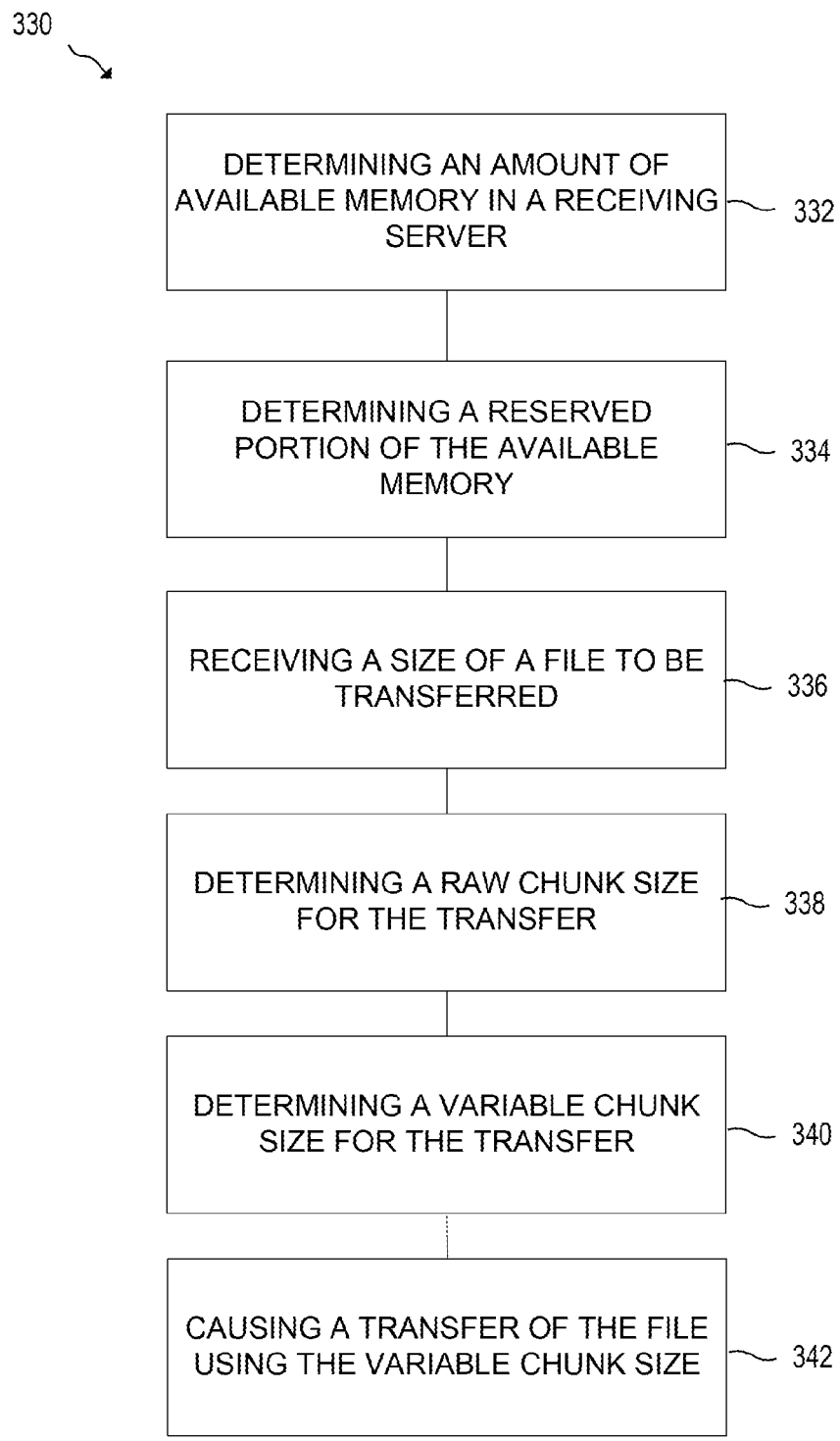
FIG. 3 illustrates an example method for determining variable chunk size for transfer of a file consistent with the present disclosure.

FIG. 3 illustrates an example method 330 for determining variable chunk size for transfer of a file consistent with the present disclosure. At 332, the method 330 may include determining an amount of available memory in a receiving server. As described in relation to FIGS. 1 and 2, the receiving server may receive a transferred file from a sending server. Determining the amount of available memory may be performed by the receiving server itself, or by another component within system 100 illustrated in FIG. 1.

At 334, the method 330 may include determining a reserved portion of the available memory to be reserved for non-transfer processes of the receiving server. As described in relation to FIGS. 1 and 2, the reserved portion of the available memory may be determined using a memory usage ratio. The memory usage ratio may be designated by an administrator. In some examples, the memory usage ratio may be dynamic, such that at one point in time a memory usage ratio of 40%/60% may be used and at a second point in time a memory usage ratio of 30%/70% may be used.

At 336, the method 330 may include receiving from the sending server, a size of the file to be transferred. In some examples, the sending server may communicate to the receiving server the size of the file to be transferred. However, examples are not so limited, and the size of the file to be transferred may be communicated to the receiving server from another component within system 100 illustrated in FIG. 1.

At 338, the method 330 may include determining a raw chunk size for transfer of the file based in part on the reserved portion of the available memory and the size of the file. For instance, the raw chunk size may be determined based on the memory usage ratio. Also, as described herein, the raw chunk size may be determined based on the size of the file to be transferred. That is, in an example, the raw chunk size may be determined to be the lesser of the size of 60% of the current available memory and 10% of the file size. Examples are not so limited, however, and the raw chunk size may be determined using different percentages and ratios as described herein.

At 340, the method 330 may include determining a variable chunk size for transfer of the file based on the raw chunk size. In some examples, determining the variable chunk size includes determining an integer that is less than the determined raw chunk size and designating the determined integer as the variable chunk size, as described in relation to FIG. 2. For backward compatibility and consistency across different platforms, the chunk size may be limited to $2^{31}-1$, even for 64-bit computer, such that the maximum chunk size is set to 1 G. As such, the method 330 may include designating, by the receiving server, a variable chunk size of 1 G responsive to determining that the variable chunk size is greater than 1 G. Similarly, the method 330 may include determining that the variable chunk size has a value less than 1 G (such as $2^{28}$ bytes), and designating the value (i.e., $2^{28}$ bytes) as the variable chunk size, in response to determining the value is less than 1 G. At 342, the method 330 may include causing a transfer of the file from the sending server to the receiving server using the variable chunk size.

Figure 4:
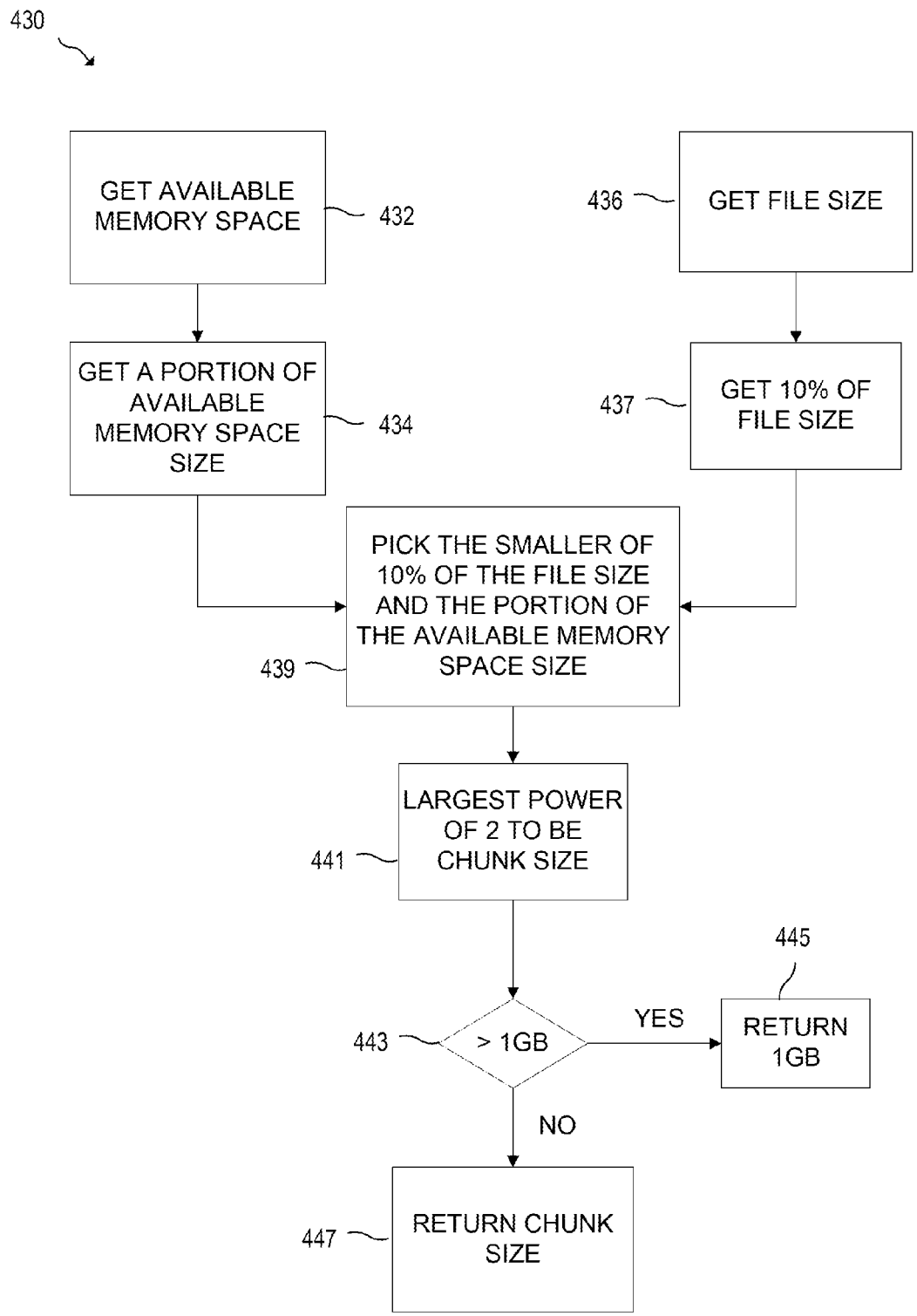
FIG. 4 further illustrates an example method for determining variable chunk size for transfer of a file consistent with the present disclosure.

FIG. 4 further illustrates an example method 430 for determining variable chunk size for transfer of a file consistent with the present disclosure. At 432, the method 430 may include getting available memory space. As described in relation to FIGS. 1, 2, and 3, the available memory space in a receiving server may be determined. In some examples, determining the amount of available memory in the receiving server may be performed in response to a request to transfer a file from a sending server to the receiving server.

At 434, the method 430 may include getting a portion of available memory space size. For instance, a portion of the available memory determined at 432 may be reserved for non-transfer processes of the receiving server. As described herein, a memory usage ratio such as 40%/60% may be used, specifying that 40% of the available memory may be reserved for non-transfer processes of the receiving server.

At 436, the method 430 may include getting the file size. For example, as described herein, the receiving server may receive from the sending server, a size of the file to be transferred. At 437, the method 430 may include getting 10% of the file size, which may correspond with one step in a file transfer progress bar. Again, while 10% is used for illustrative purposes, examples are not so limited and one step in the file transfer progress bar may correlate with a different portion or fraction of the total file size. For instance, the file transfer progress bar may be updated in 5% increments, or in 8% increments.

At 439, the method 430 may include picking the smaller of 10% of the file size and the portion of the available memory space size to be the raw chunk size, as described in relation to FIGS. 1, 2, and 3. Finally, at 441, the method 430 may include determining that the largest power of 2 is the variable chunk size. The largest power of 2 may define the size of the variable chunk size, such that the variable chunk size does not exceed the memory storage capabilities of the receiving server.

At 443, the method 430 may include determining if the chunk size is greater than a threshold size, such as 1 G. As described herein, for backward compatibility and consistency across different platforms, the chunk size may be limited to $2^{31}-1$, even for 64-bit computer, such that the maximum chunk size is set to 1 G. While 1 G is used as an example threshold size, examples are not so limited, and the variable chunk size may be defined using other thresholds, such as 2 G.

If, at 447, it is determined that the variable chunk size is less than the threshold size (less than 1 G in the above example), the method 430 may include returning the determined variable chunk size. For instance, if the variable chunk size is determined to be 800 MB, then the method 430 would include returning or using the variable chunk size of 800 MB. If, however, it is determined at 445 that the variable chunk size is greater than or equal to the threshold (greater than or equal to 1 G in the above example), then at 445, the method 430 may include returning a chunk size of 1 G.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system for determining variable chunk size for transfer of a file, comprising:
   a processor; and
   a non-transitory machine readable medium storing instructions that, when executed by the processor, cause the processor to:
   determine an amount of available memory that corresponds to an amount of memory not being used by running processes of a receiving server, wherein the receiving server is to receive a transferred file greater than a threshold size from a sending server;
   determine a raw chunk size for transfer of the file based on the available memory of the receiving server and a memory usage ratio for the receiving server;
   determine a variable chunk size for transfer of the file by application of a memory storage integer limitation of the receiving server to the raw chunk size; and
   cause a transfer of the file from the sending server to the receiving server using the variable chunk size.

2. The system of claim 1, wherein the instructions when executed cause the processor to determine the variable chunk size based on a number of bytes in the receiving server.

3. The system of claim 1, wherein the determined raw chunk size is a first raw chunk size, and the non-transitory machine readable medium stores instructions that, when executed, cause the processor to receive a size of the file to be transferred from the sending server and determine a second raw chunk size corresponding to a step in a file transfer progress bar, the step being a percentage of the size of the file.

4. The system of claim 3, wherein the non-transitory machine readable medium stores instructions that, when executed, cause the processor to determine the raw chunk size by selecting one of the first raw chunk size and the second raw chunk size based on byte size.

5. The system of claim 3, wherein the non-transitory machine readable medium stores instructions that, when executed, cause the processor to determine the raw chunk size by selecting a lesser of the first raw chunk size and the second raw chunk size.

6. The system of claim 5, wherein the step is a 10% increment.

7. The system of claim 1, wherein the memory usage ratio is a predetermined ratio of the available memory in the receiving server and a maximum raw chunk size.

8. A non-transitory machine-readable medium storing instructions executable by a processor to cause the processor to:
   determine an amount of available memory in a receiving server, wherein the receiving server is to receive a transferred file from a sending server and the available memory corresponds to an amount of memory of the receiving server not being used by non-transfer processes;
   reserve a portion of the available memory of the receiving server for non-transfer processes;
   determine a raw chunk size for transfer of the file based on the amount of available memory;
   determine a variable chunk size for transfer of the file based on a number of bytes for addressing memory in the receiving server and the raw chunk size; and
   cause a transfer of the file from the sending server to the receiving server based on the variable chunk size.

9. The non-transitory machine-readable medium of claim 8, wherein the instructions to determine the raw chunk size include instructions executable by the processor to:
   receive from the sending server, a size of the file to be transferred; and
   determine a fraction of the file size that corresponds with a step in a file transfer update bar.

10. The non-transitory machine-readable medium of claim 9, wherein the instructions to determine the raw chunk size include instructions executable by the processor to select as the raw chunk size the lesser of the amount of available memory or the fraction of the file size.

11. The non-transitory machine-readable medium of claim 8, wherein the instructions to determine the raw chunk size include instructions executable by the processor to:
   determine a remaining portion of the available memory for transfer of the file, based on the reserved portion; and
   identify a lesser of a raw chunk size corresponding to the remaining memory and a raw chunk size corresponding to a fraction of the file.

12. The non-transitory machine-readable medium of claim 8, wherein the instructions to determine the amount of available memory include instructions executable by the processor to:
   determine the amount of available memory in the receiving server in response to receipt of a request from the sending server to transfer the file from the sending server to the receiving server;
   wherein the file has a size within a threshold range file size.

13. The non-transitory machine-readable medium of claim 8, wherein the instructions to transfer the file from the sending server to the receiving server include instructions executable by the processor to:

transfer the file in a plurality of chunks, wherein each of the plurality of chunks has a size corresponding to the variable chunk size.

14. The non-transitory machine-readable medium of claim 8, wherein the file is a first file and the determined variable chunk size is a first variable chunk size, non-transitory machine-readable the medium further including instructions executable by the processor to:

determine a second variable chunk size for transfer of a second file from the sending server to the receiving server, wherein the second variable chunk size is different than the first variable chunk size.

15. A method for determining variable chunk size for transfer of a file, comprising:

determining an amount of available memory that corresponds to an amount of memory not being used by running processes of a receiving server, wherein the receiving server is to receive a transferred file from a sending server;

determining a reserved portion of the available memory to be reserved for non-transfer processes of the receiving server;

receiving from the sending server, a size of the file to be transferred;

determining a raw chunk size for transfer of the file based in part on the amount of available memory and the size of the file;

determining a variable chunk size for transfer of the file by applying a memory storage integer limitation to the raw chunk size; and causing a transfer of the file from the sending server to the receiving server using the variable chunk size.

16. The method of claim 15, wherein determining the variable chunk size includes determining an integer that is less than the determined raw chunk size and designating the determined integer as the variable chunk size.

17. The method of claim 15, further comprising designating, by the receiving server, a variable chunk size of 1 gigabyte responsive to determining that the variable chunk size is greater than 1 gigabyte.

18. The method of claim 15, further comprising:

determining that the variable chunk size has a value less than 1 gigabyte; and designating the value as the variable chunk size, in response to determining the value is less than 1 gigabyte.

19. The method of claim of claim 15, wherein the determining a raw chunk size includes selecting as the raw chunk size the lesser of the amount of available memory and a percentage of the size of the file corresponding to a step in a file transfer progress bar.

\* \* \* \* \*